United States Patent
Menon et al.

(10) Patent No.: US 12,446,061 B2
(45) Date of Patent: Oct. 14, 2025

(54) SUB-SLICING WITHIN A NETWORK SLICE

(71) Applicant: AT&T Intellectual Property I, L.P., Atlanta, GA (US)

(72) Inventors: Sreejith Menon, Herndon, VA (US); John Hursey, Lawrenceville, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 627 days.

(21) Appl. No.: 17/653,214

(22) Filed: Mar. 2, 2022

(65) Prior Publication Data
US 2023/0284252 A1 Sep. 7, 2023

(51) Int. Cl.
H04W 4/00 (2018.01)
H04W 12/037 (2021.01)
H04W 28/02 (2009.01)
H04W 48/18 (2009.01)
H04W 72/542 (2023.01)
G16Y 10/75 (2020.01)

(52) U.S. Cl.
CPC ....... *H04W 72/542* (2023.01); *H04W 12/037* (2021.01); *H04W 28/0268* (2013.01); *H04W 48/18* (2013.01); *G16Y 10/75* (2020.01)

(58) Field of Classification Search
CPC .................................................. H04W 28/16
See application file for complete search history.

(56) References Cited

U.S. PATENT DOCUMENTS

| | | | | |
|---|---|---|---|---|
| 12,063,559 B2* | 8/2024 | Sillanpää | ............... | H04W 48/18 |
| 2009/0010155 A1* | 1/2009 | Liu | .................. | H04Q 3/0066 370/230 |
| 2009/0190567 A1* | 7/2009 | Lim | ................. | H04H 20/42 370/310 |
| 2019/0174320 A1* | 6/2019 | Kodaypak | ............... | H04L 41/00 |
| 2019/0372853 A1* | 12/2019 | Bainbridge | ......... | H04L 41/0806 |
| 2020/0053834 A1* | 2/2020 | Dahan | ................. | H04L 41/0816 |
| 2020/0412612 A1* | 12/2020 | Cherunni | ................ | H04L 43/20 |
| 2022/0014434 A1* | 1/2022 | Shi | ...................... | H04L 41/5019 |
| 2023/0276324 A1* | 8/2023 | Sebire | ............... | H04W 36/0058 370/331 |

FOREIGN PATENT DOCUMENTS

KR     102362027 B1 *  2/2022  ............. H04W 4/50

OTHER PUBLICATIONS

Afolabi et al., Network Slicing-Based Customization of 5G Mobile Services, IEEE, Sep./Oct. 2019, pp. 134-141. (Year: 2019).*

* cited by examiner

*Primary Examiner* — Elisabeth Benoit Magloire

(57) ABSTRACT

The disclosed technology is directed towards facilitating the creation of network sub-slices within a network slice. When a network slice having defined default specification data (e.g., quality of service and prioritization levels) is instantiated, resources of the network slice can be allocated to network sub-slices within the network slice. A network sub-slice has modified specification data relative to the default specification data. Upon connection of a mobile device to the network, if the mobile device is part of a group associated with a network slice and sub-slice, the mobile device traffic is handled based on its network slice default specification data as modified by the modified sub-slice specification data. Network sub-slices thus provide a way for variations within the parameter data of a network slice, without the overhead and need to instantiate a separate network slice for each variation needed by subscribing entities.

20 Claims, 10 Drawing Sheets

SUB-SLICING WITHIN A NETWORK SLICE

TECHNICAL FIELD

The subject application relates to wireless communications systems in general, and more particularly to network slicing in cellular wireless communications.

BACKGROUND

A network slice is an independent end-to-end logical network that runs on a shared physical infrastructure, capable of providing a guaranteed service quality. The underlying logical differentiation is inherently transparent to the business/customer. Cellular operators can define slicing logic, which can mean a single network slice type that satisfies multiple vertical needs, or multiple separate slices as a single product.

Not every customer exactly matches the defined specification data associated with a network slice. For example, consider a network slice defined for public safety network data traffic; a police department in a large city may have different requirements than a fire department in a small city. Although the differences may be slight, the current way to handle such differences is to define a separate network slice for each department, which is not particularly efficient.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
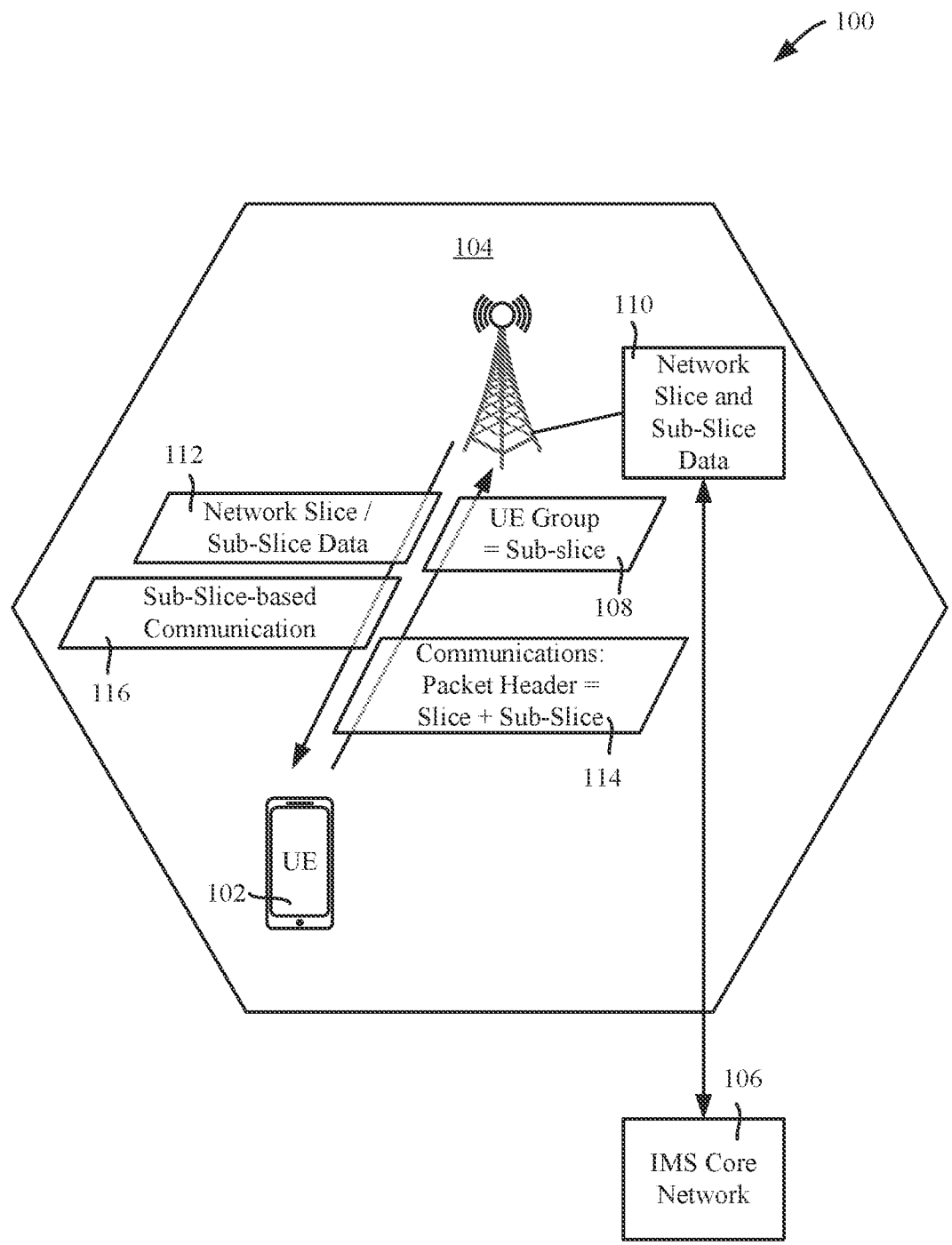
FIG. 1 is a block diagram illustrating an example wireless communication system configured for network sub-slice communications, in accordance with various aspects and embodiments of the subject disclosure.

The technology described herein is generally directed towards network sub-slicing that divides the resources of a network slice into network sub-slices. A user of the sub-slice generally gets the data parameters (e.g., service offering and/or feature set) specified for the network slice, with one or more parameters modified in some way that differentiates the user's communications from those of users of the network slice's default parameter data.

By way of example, consider a public safety network slice, with default data parameters that provide a higher quality of service level, higher prioritization and the like to public safety users relative to general non-public safety users. The public safety network slice can be divided into sub-slices such as a public safety IoT (internet of things) device sub-slice, a public safety end-to-end encrypted traffic sub-slice, a public safety mission critical traffic sub-slice, and so on. Based on the group to which a user/device is associated, the corresponding sub-slice can be allocated for that user/device. Thus, for example, within the public safety network slice, one police department's communication traffic can be end-to-end encrypted, while another police department's communication traffic is not end-to-end encrypted. Public safety IoT device traffic can be lower priority relative to mission critical traffic, and so on.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

As shown in the example system 100 of FIG. 1, a mobile device (user equipment, or UE) 102 within a cell 104 attaches/registers to an IMS (IP multimedia subsystem) core network 106, providing information 108 (e.g., an identifier) that identifies the mobile device 102 as being a valid user belonging to a user group. In this example, consider that the user group is associated with a sub-slice, and thus the network slice and sub-slice data (blocks 110 and 112) are returned to the user device. Based on the network slice and sub-slice data 112, the mobile device 102 creates an initiation of the bearer setup for the slice and sub-slice.

Once the bearer is set up, user data communications 114 from the mobile device 102 contain a packet header that indicates that the communications 114 are to be controlled (e.g., scheduled/managed/handled) in accordance with the data parameters of the sub-slice, which generally include the default data parameters specified for the network slice but with one or more modified data parameters specified for the network sub-slice. Thus, instead of needing instantiation of an entirely new network slice for the modified data parameters, only a modification of the bearer at setup is needed for the mobile device's communications to be handled according to the desired specified data parameters.

Figure 2:
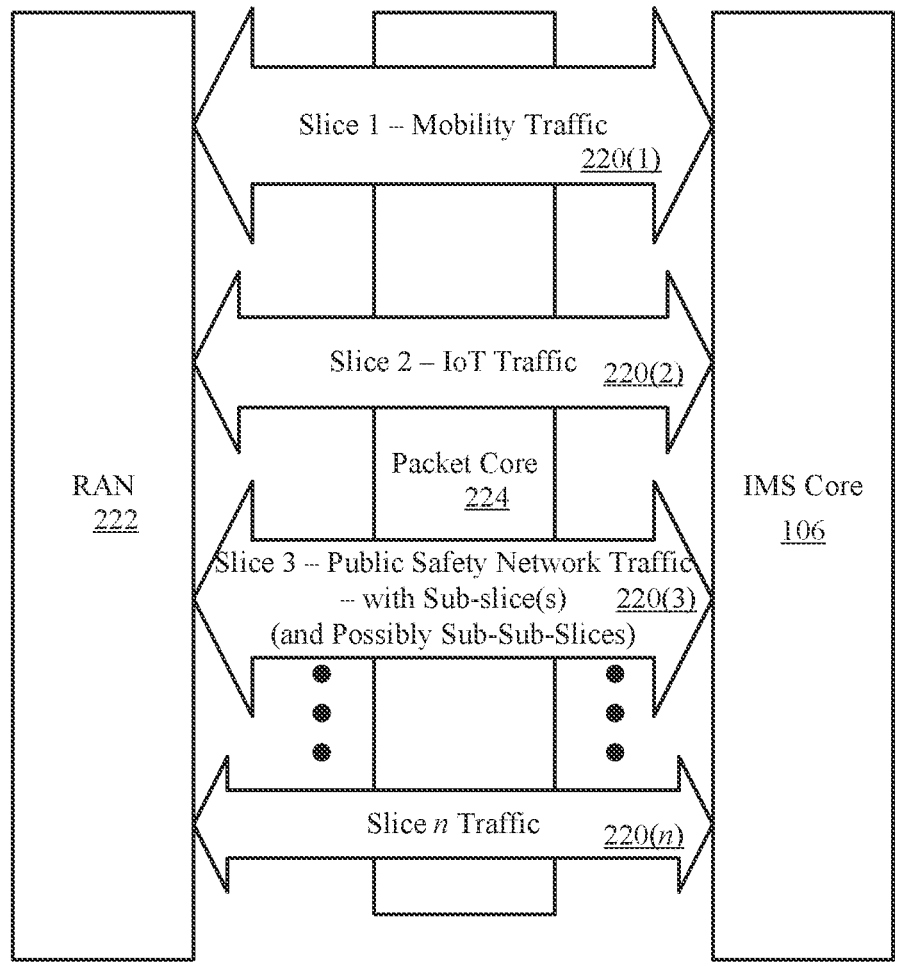
FIG. 2 is a representation of network slices, including a network slice containing sub-slices, in accordance with various aspects and embodiments of the subject disclosure.

FIG. 2 shows an example of one way in which network slices 220(1)-220(n) can be used for radio access network (RAN) 222 communications via a packet core 224 to and from the IMS core 106 with respect to the communications of different groups of mobile devices. In the example of FIG. 2, at least the public safety slice 220(2) network traffic is divided into sub-slice(s).

For example, consider that the public safety slice is subject to the following requirements, each of which have some (possibly slight) parameter data specified therefor:
1. Public Safety with IoT devices (x devices)
2. Public Safety devices with end to end encryption (y devices)
3. Public Safety devices that require MC services (z devices)

Instead of creating individual slices, the technology described herein creates multiple sub-slices, e.g., within the public safety network slice. By default each sub-slice generally gets the same default/universal public safety parameter data specifications, however based on to which public safety user group a device is associated, each user group is allocated a specific sub-slice with modified parameter data specifications.

Moreover, there can be other permutations and combinations of deltas leading to a sub-sub-slice scenario, such as within a hierarchical enterprise offering. For example, consider a function offering with network slice 'A', such as for public safety network traffic. A police agency, e.g., a large one, has some modified parameters of network slice 'A' that are implemented via a sub-slice 'b'. Further, incident commanders (high priority roles within the police agency) can have a sub-sub-slice 'c' with some parameters of sub-slice 'b' tweaked based on their high priority. FIG. 2 indicates this within the public safety network traffic 220(3), however the sub-sub-slice concept is not limited to public safety network traffic. Indeed, other enterprises can have a similar sub-sub-slice modification; for example, consider a mobility traffic network slice with an enterprise end-to-end encrypted traffic sub-slice for certain key employees, with corporate executives being part of the end-to-end encrypted traffic sub-slice but also having a higher priority sub-sub-slice, relative to non-executive key employees, within the end-to-end encrypted traffic sub-slice.

Figure 3:
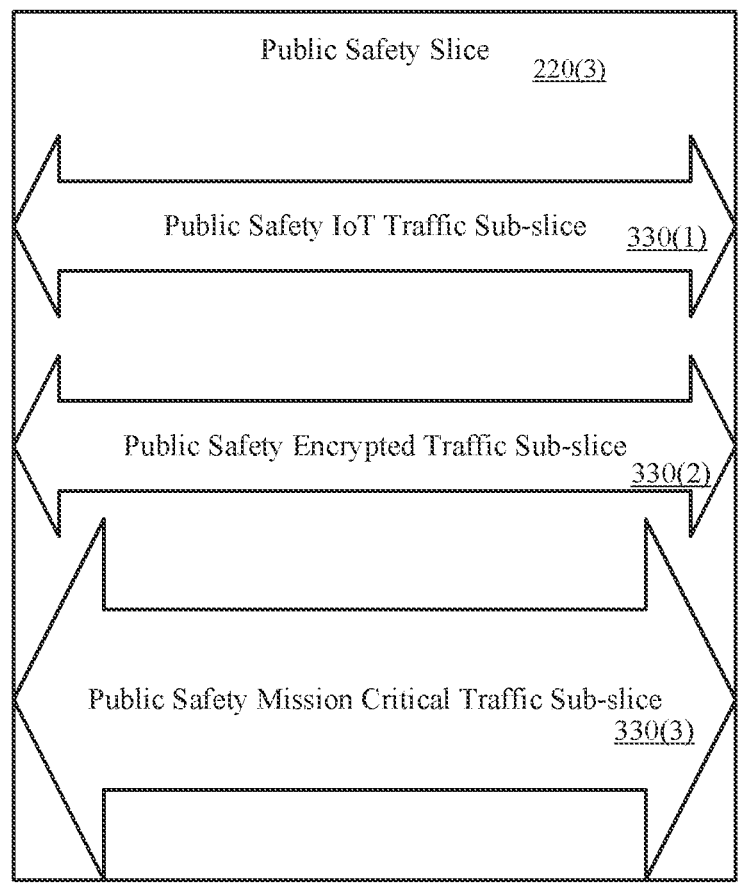
FIG. 3 is a representation of a network slice, in the example of a public safety slice that includes sub-slices, in accordance with various aspects and embodiments of the subject disclosure.

FIG. 3 is a representation of dividing the resources (e.g., bandwidth) allocated to the network slice into three sub-slices 330(1)-330(2) within the public safety network slice 220(3) (e.g., of FIG. 2). For example, the public safety IoT sub-slice 330(1) can be allocated twenty-five percent of the public safety network slice 220(3) bandwidth, the public safety encryption sub-slice 330(2) can be allocated twenty-five percent of the public safety network slice 220(3) bandwidth, and the public safety, and the public mission critical sub-slice 330(3) can be allocated fifty percent of the public safety network slice 220(3) bandwidth. As is understood, these are only example bandwidth allocations, and other bandwidth allocations (e.g., x %, y % and z % . . . ) can be configured, and/or can change over time.

Further, there can be other types of sub-slices. Consider that a medical service provider is willing to pay extra for its key employees to have mobile devices with a first quality of service guarantee as a default network slice. However for an additional cost, the medical service surgeons' mobile devices are given a second, higher quality of service (and possibly lower latency) guarantee. Thus, within a network slice defined for that medical service provider that by default provides a first group of devices with the first quality of service guarantee, a sub-slice can be defined that provides a second group of devices with the second quality of service guarantee.

Figure 4:
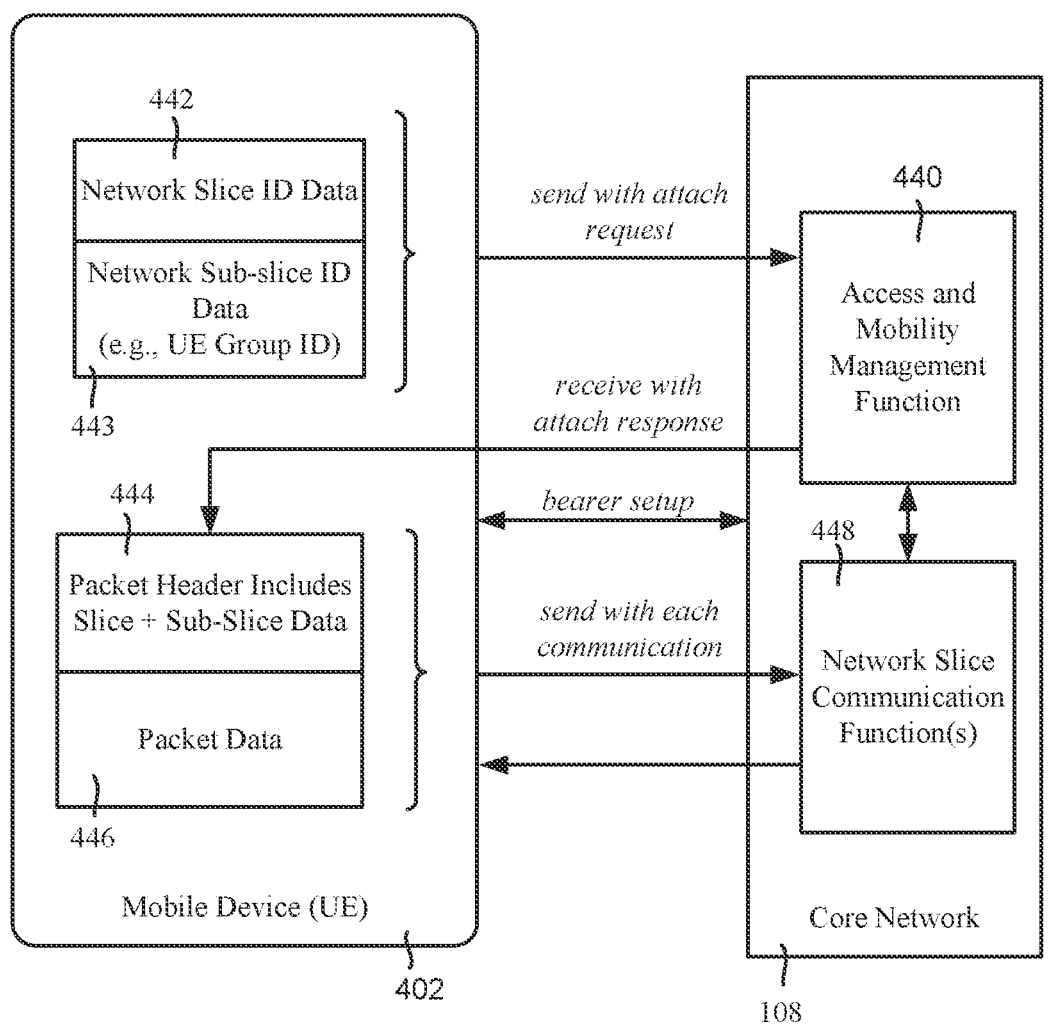
FIG. 4 is an example representation of setting up and performing network sub-slice communications, in accordance with various aspects and embodiments of the subject disclosure.

FIG. 4 shows a mobile device 402 coupled to a core network 108. When the mobile device attaches to the core network, the mobile device couples to a 5g access and mobility management function 440 (or home subscriber service for 4G-LTE) that manages the registration, connection and mobility management between the device 102 and the network, including assigning a default network slice to use, and (as described herein) a network sub-slice As part of this operation, as described herein the mobile device provides data 442 and 443 that identifies the mobile device 402 as being associated with a certain network slice, and in this example, a network sub-slice, respectively. This can be some unique number, e.g., based on the international mobile equipment identity (IMEI) and/or international mobile subscriber identity (IMSI) by which the network slice and network sub-slice can be determined by the core network's components, or some other value such as a "group ID" common to devices of the same group by which the group is mapped to the account type, including sub-slice.

In any event, the core network returns information 444 including network slice and sub-slice data by which the mobile device a bearer is established between the device and endpoint, that is, the device is now assigned to a network slice, sub-slice bearer. Note that the mobile device 402 is configured with the hardware chipset, intelligence, capability, processing and the like to create a network slice (as before), as well as a network sub-slice according to the technology described herein.

Once the bearer is established, the information 444 is also used (possibly reformatted as appropriate) in each packet header that accompanies packet data 446 in communications from the device, e.g., device packets are marked by their headers such as device slice Q, sub-slice x. In this way, the core network 108 (e.g., network slice communication function(s) 448) appropriately handles the communication according to the defined parameter data specified for that sub-slice, e.g., modified sub-slice parameter data of the underlying "umbrella" network slice.

Figure 5:
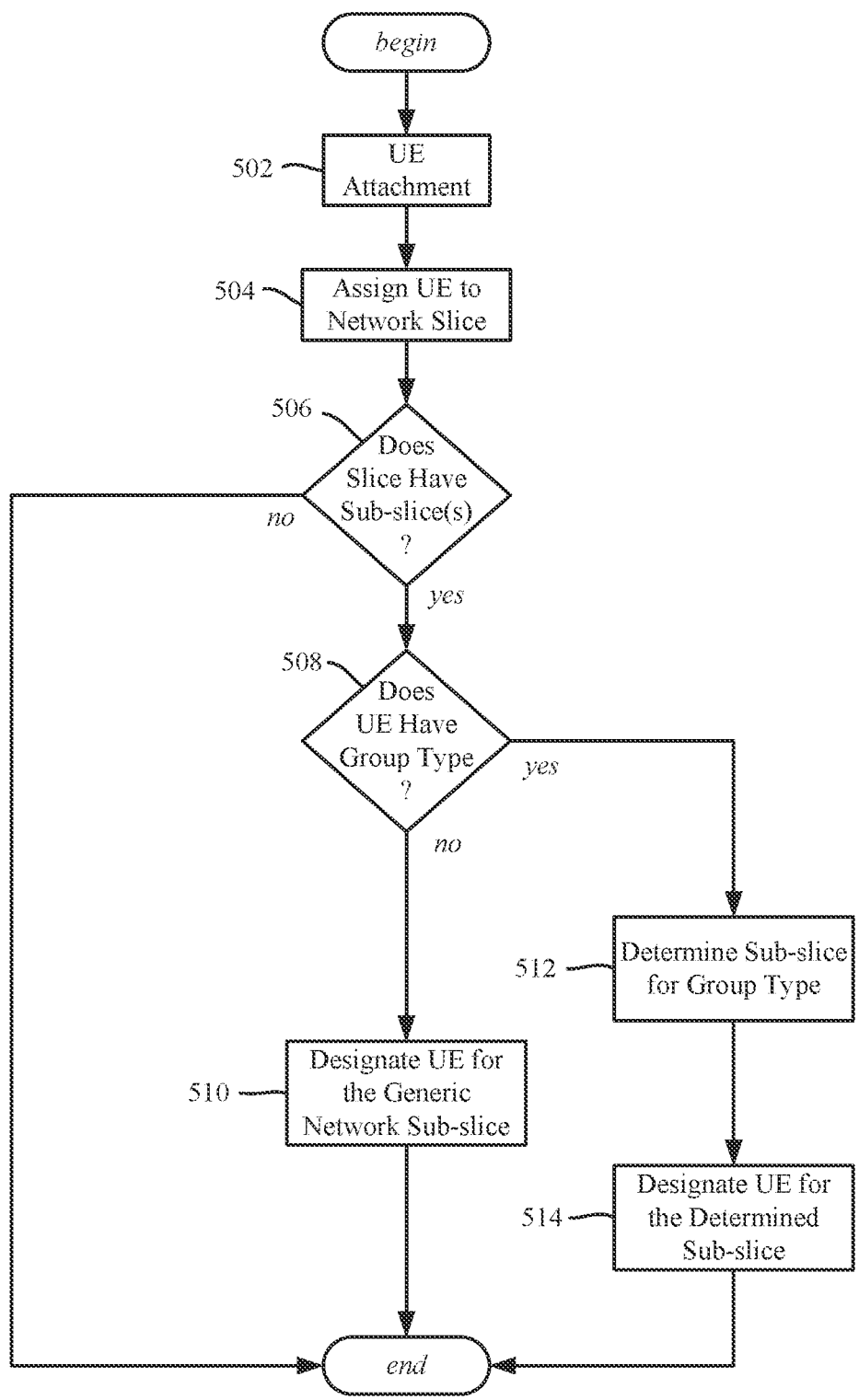
FIG. 5 is a flow diagram representing example operations for determining a network slice and sub-slice designation when attaching a user equipment device, in accordance with various aspects and embodiments of the subject disclosure.

FIG. 5 shows example operations that occur as part of user equipment (UE) device attachment (operation 502) with respect to network slice and sub-slice designation. Note that FIG. 5 assumes other attachment operations (e.g., authentication of a valid subscriber and the like) have been or will be appropriately handled.

Operation 504 assigns the UE device to a network slice based on the identification information 442 and 443, FIG. 4) provided by the UE device. Operation 506 evaluates whether the network slice has any sub-slice or sub-slices. If not, the process ends with respect to network slice designation, and the bearer is established based on the assigned network slice.

If instead at operation 506 there is a network sub-slice, operation 508 determines whether the UE device is associated with a user group type for which a sub-slice is designated. If not, operation 510 designates the UE device for the generic network sub-slice, e.g., the public safety mission critical traffic sub-slice 330(3) in FIG. 3. If there is a user group type for which a sub-slice is designated, as represented by operations 512 and 514 of FIG. 5, the UE device is designated to use one of the sub-slice categories based on the group type, e.g., the public safety IoT traffic sub-slice 330(1) or the public encrypted traffic sub-slice 330(2) in FIG. 3.

In this way, the technology described herein facilitates the creation of multiple logical sub-slices within a main slice for varied use cases. This avoids the overhead of instantiating individual network slices, such as when much of the parameter data (e.g., performance requirements and/or feature set data, such as IP address data, network type data, packet size data, cloud computing service data, and/or cloud-based infrastructure resource data) is shared, with only relatively small variations. Other per-network slice overhead can be saved rather than repeated, such as performance monitoring on a single slice monitoring channel. Notwithstanding, there can be per-network sub-slice information collected, such as for more detailed billing, monitoring and performance views across the sub-slices.

Figure 6:
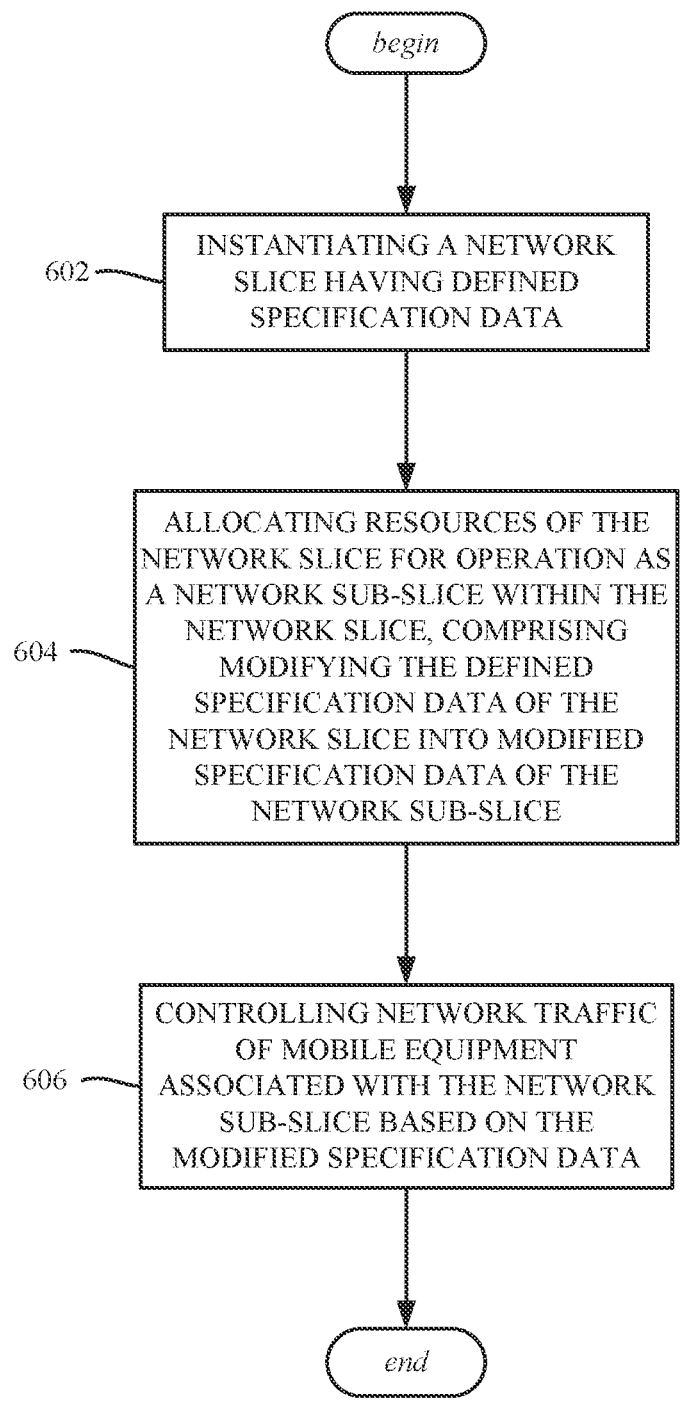
FIG. 6 is a flow diagram representing example operations related to modifying defined specification data of a network slice into modified specification data of a network sub-slice, in accordance with various aspects and embodiments of the subject disclosure.

One or more example aspects are represented in FIG. 6, and can correspond to a system, comprising a processor, and a memory that stores executable instructions or components that, when executed by the processor, facilitate performance of operations. Example operation 602 represents instantiating a network slice having defined specification data. Example operation 604 represents allocating resources of the network slice for operation as a network sub-slice within the network slice, comprising modifying the defined specification data of the network slice into modified specification data of the network sub-slice. Example operation 606 represents controlling (e.g., handling, scheduling, managing) network traffic of mobile equipment associated with the network sub-slice based on the modified specification data.

The resources of the network slice can enable a total bandwidth allocated to the network slice, and allocating the resources of the network slice for operation as the network sub-slice can include allocating a percentage of the total bandwidth to the network sub-slice.

Further operations can include determining a group type of a mobile device during network attachment of the mobile device, and mapping the mobile device to the network sub-slice based on the group type.

The defined specification data of the network slice can correspond to a first quality of service level, and the modified specification data of the network sub-slice can correspond to a second quality of service level that is different from the first quality of service level.

The defined specification data of the network slice can correspond to a first feature set, and the modified specification data of the network sub-slice can correspond to a second feature set that is different from the first feature set.

The second feature set can be different from the first feature set based on a difference in at least one of: IP address data, network type data, packet size data, cloud computing service data, or cloud-based infrastructure resource data.

The defined specification data of the network slice can correspond to a first type of internet of things device, and the modified specification data of the network sub-slice can correspond to a second type of internet of things device.

The defined specification data of the network slice can correspond to a public safety network slice, and the network sub-slice can be specified for public safety internet of things devices.

The defined specification data of the network slice can correspond to a public safety network slice, and the network sub-slice can be specified for public safety devices with encrypted communications.

The defined specification data of the network slice can correspond to a public safety network slice, and the network sub-slice can be specified for public safety devices with mission critical services.

The resources of the network slice can include first resources and second resources, the network sub-slice can be a first network sub-slice allocated from the first resources, and further operations can include allocating the second resources of the network slice for operation as a second network sub-slice.

Figure 7:
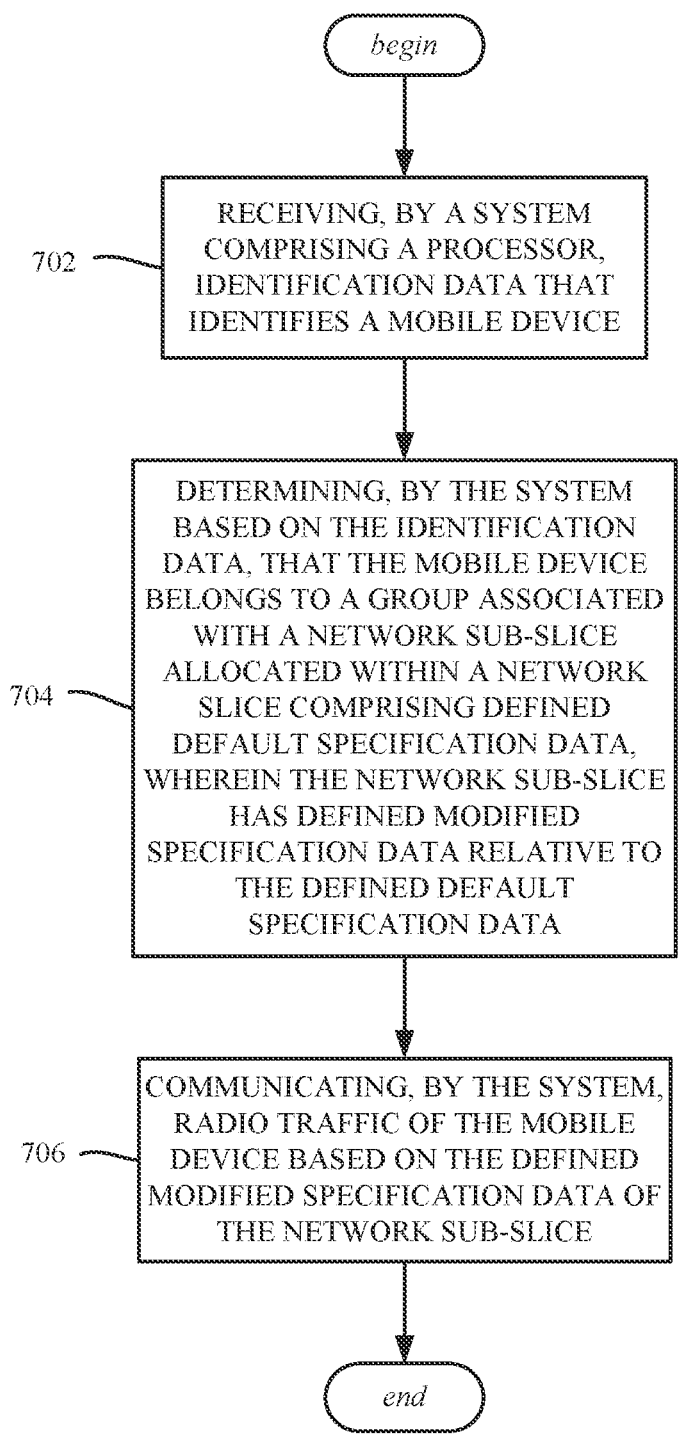
FIG. 7 is a flow diagram representing example operations related to communicating radio traffic of a mobile device based on defined modified specification data of a network sub-slice, in accordance with various aspects and embodiments of the subject disclosure.

One or more example aspects are represented in FIG. 7, and can correspond to operations, e.g., of a method. Operation 702 represents receiving, by a system comprising a processor, identification data that identifies a mobile device. Operation 704 represents determining, by the system based on the identification data, that the mobile device belongs to a group associated with a network sub-slice allocated within a network slice comprising defined default specification data, wherein the network sub-slice has defined modified specification data relative to the defined default specification data. Operation 706 represents communicating, by the system, radio traffic of the mobile device based on the defined modified specification data of the network sub-slice.

Determining that the mobile device belongs to the group associated with the network sub-slice can include mapping at least one of: an international mobile equipment identity number of the mobile device to the group, or an international mobile subscriber identity number of the mobile device to the group.

Further operations can include allocating, by the system, the resources of the network sub-slice based on resources of the network slice.

The resources of the network slice can include first resources and second resources, the network sub-slice can be is a first network sub-slice allocated from the first resources, and further operations can include allocating, by the system, the second resources of the network slice for operation as a second network sub-slice within the network slice.

The identification data can be first identification data, the mobile device can be a first mobile device, the group can be a first group, the radio traffic of the first mobile device can be first radio traffic, and further operations can include receiving, by the system, second identification data that identifies a second mobile device, determining, by the system based on the second identification data, that the second mobile device belongs to a second group associated with the network slice and not the network sub-slice, and communicating, by the system, second radio traffic of the second mobile device based on the defined default specification data specification data of the network slice.

Determining that the mobile device belongs to the group associated with the network sub-slice can include determining that the mobile device is a public safety network internet of things device.

Communicating the radio traffic of the mobile device based on the defined modified specification data of the network sub-slice can include communicating encrypted data to and from the mobile device.

Figure 8:
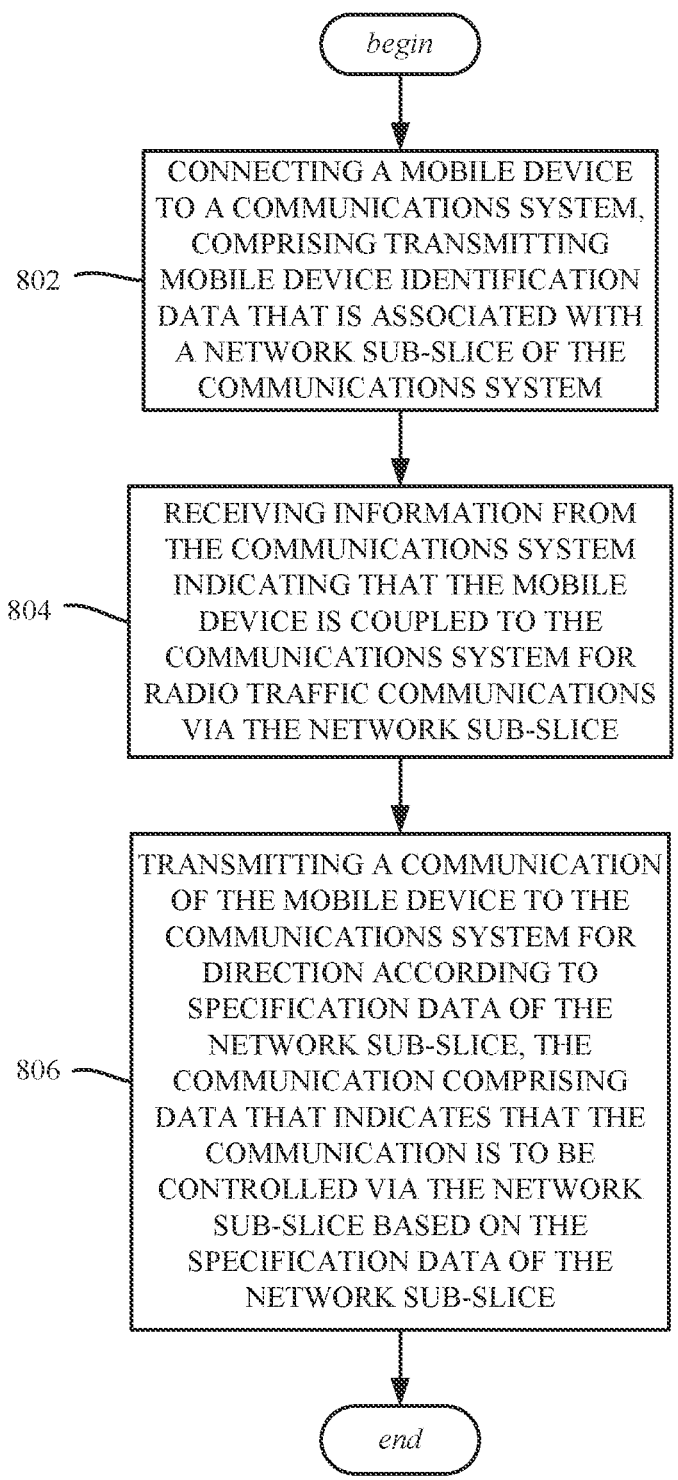
FIG. 8 is a flow diagram representing example operations related to communications of a mobile device for handling by the network based on network sub-slice specification data, in accordance with various aspects and embodiments of the subject disclosure.

One or more aspects are represented in FIG. 8, such as implemented in a machine-readable medium, comprising executable instructions that, when executed by a processor of a mobile device, facilitate performance of operations. Example operation 802 represents connecting the mobile device to a communications system, comprising transmitting mobile device identification data that is associated with a network sub-slice of the communications system. Example operation 804 represents receiving information from the communications system indicating that the mobile device is coupled to the communications system for radio traffic communications via the network sub-slice. Example operation 806 represents transmitting a communication of the mobile device to the communications system for direction according to specification data of the network sub-slice, the communication comprising data that indicates that the communication is to be controlled via the network sub-slice based on the specification data of the network sub-slice.

Transmitting the communication of the mobile device can include transmitting the data that indicates that the communication is to be directed via the network sub-slice in a packet header of the communication.

As can be seen, the technology described herein provides more granularity-based differentiation within a network slice via sub-slices, and thus does not require a dedicated slice to be created for each set of common network slice parameters. This saves computing, storage and networking resources for the underlying infrastructure. A business vertical gets a single view of the overall slice and each sub-slice. Based on the needs (e.g., service level agreement, bandwidth, quality of service and the like) a network slice's bandwidth can be increased or decreased, which saves on computing and network resource, as the underlying logical slice for a business vertical remains the same. Efficiency is gained by reduced overhead, e.g., instead of repeated slice instantiation, only modification of the bearer is needed.

Thus, for example, if within a business vertical if there is a common universal/default set of needs that is mostly met (e.g., seventy percent) by the parameter data specified for a network slice, but certain custom needs (e.g., thirty percent) for a particular subgroup exist above and beyond those met by the general network slice, providing a sub-slice within a slice avoids the need to create a dedicated slice. Rather, the technology described herein facilitates the creation of a sub-slice within the general slice for the particular subgroup.

This is valuable as more and more private networks with unique delta use cases or feature requirements arise, with the sub-slice specifying only the delta variables. Sub-sub-slices can also be implemented as described herein.

Turning to aspects in general, a wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

Figure 9:
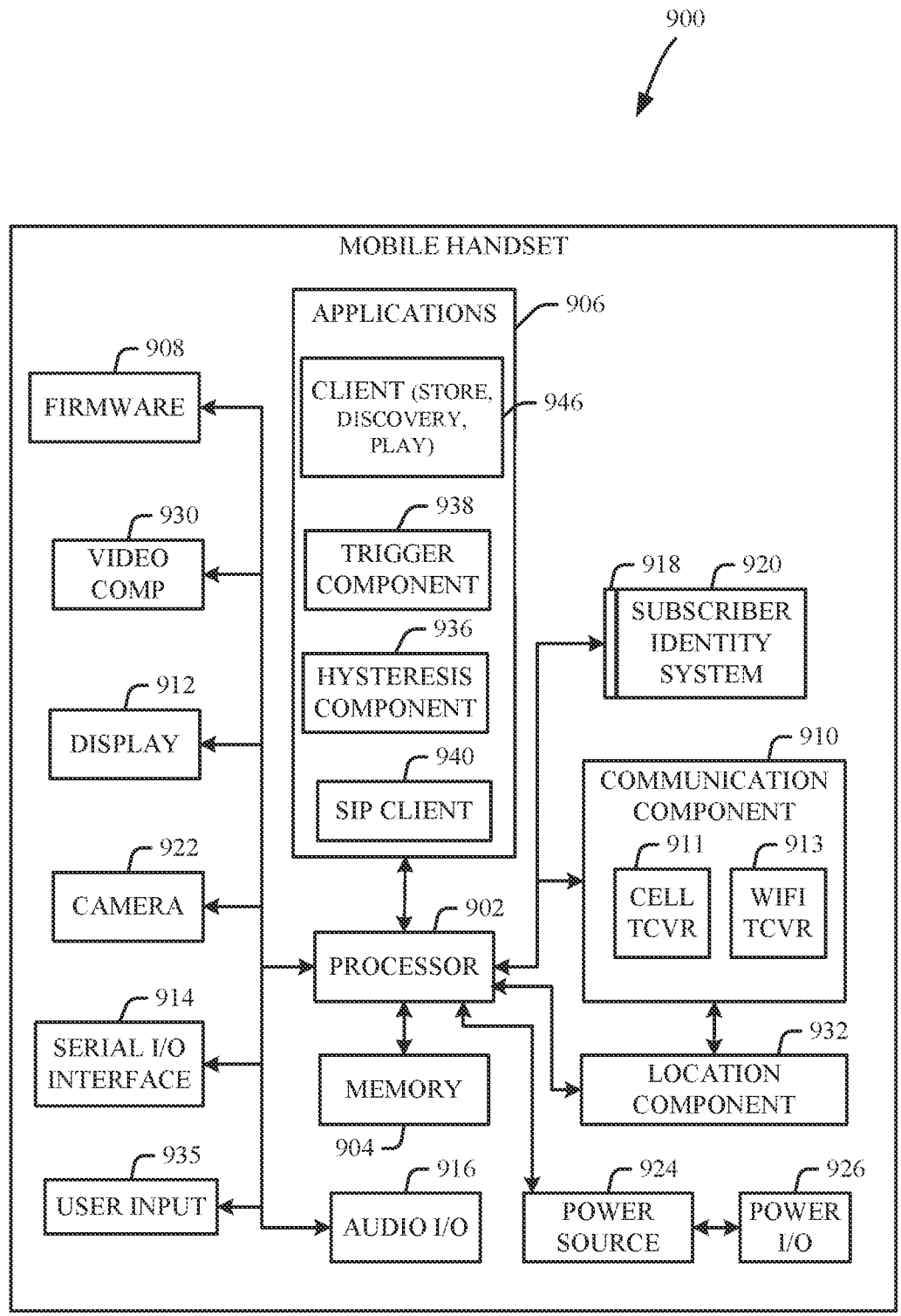
FIG. 9 illustrates an example block diagram of an example mobile handset operable to engage in a system architecture that facilitates wireless communications according to one or more embodiments described herein.

Referring now to FIG. 9, illustrated is a schematic block diagram of an example end-user device (such as user equipment) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 994) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 810, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
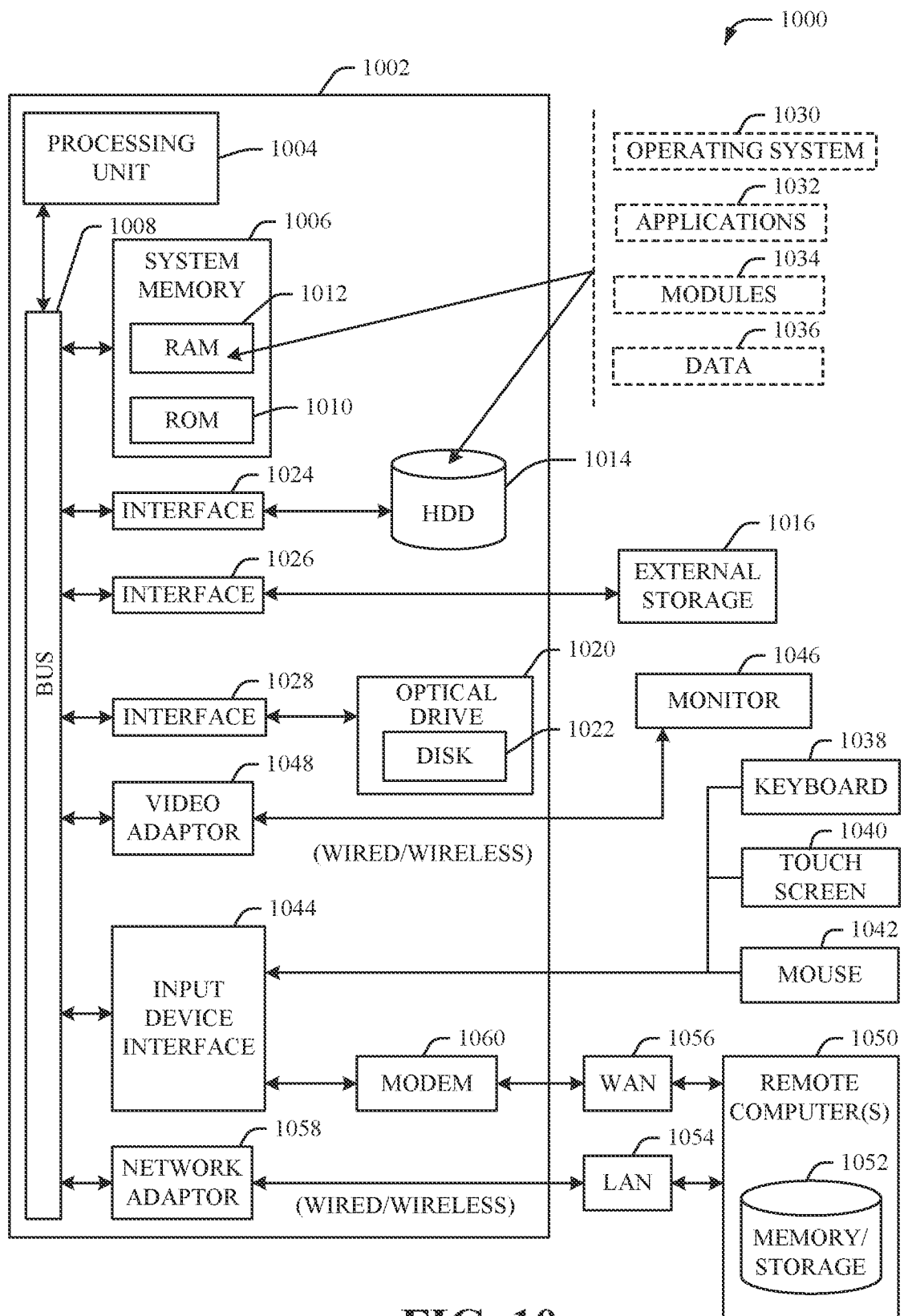
FIG. 10 illustrates an example block diagram of an example computer/machine system operable to engage in a system architecture that facilitates wireless communications according to one or more embodiments described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD), non-volatile memory and other storage technology could be used in addition to, or in place of, an HDD 1014, and can be internal or external. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 994 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally include emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can include one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 994 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 10 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A system, comprising:
   a processor; and
   a memory that stores executable instructions that, when executed by the processor of the system, facilitate performance of operations, the operations comprising:
   instantiating a network slice having defined specification data, wherein the network slice comprises an end-to-end logical network;
   allocating resources of the network slice for operation as a network sub-slice within the network slice, wherein the allocating comprises modifying the defined specification data of the network slice into modified specification data of the network sub-slice, wherein the resources of the network slice provide a total bandwidth to be allocated to the network slice, and wherein the allocating the resources of the network slice for operation as the network sub-slice comprises allocating a percentage of the total bandwidth to the network sub-slice; and
   controlling network traffic of mobile equipment associated with the network sub-slice based on the modified specification data.

2. The system of claim 1, wherein the operations further comprise determining a group type of a mobile device during a network attachment of the mobile device, and mapping the mobile device to the network sub-slice based on the group type.

3. The system of claim 1, wherein the defined specification data of the network slice corresponds to a first quality of service level, and wherein the modified specification data of the network sub-slice corresponds to a second quality of service level that is different from the first quality of service level.

4. The system of claim 1, wherein the defined specification data of the network slice corresponds to a first feature set, and wherein the modified specification data of the network sub-slice corresponds to a second feature set that is different from the first feature set.

5. The system of claim 4, wherein the second feature set is different from the first feature set based on a difference in at least one of: IP address data, network type data, packet size data, cloud computing service data, or cloud-based infrastructure resource data.

6. The system of claim 1, wherein the defined specification data of the network slice corresponds to a first type of internet of things device, and wherein the modified specification data of the network sub-slice corresponds to a second type of internet of things device.

7. The system of claim 1, wherein the defined specification data of the network slice corresponds to a public safety network slice, and wherein the network sub-slice is specified for public safety internet of things devices.

8. The system of claim 1, wherein the defined specification data of the network slice corresponds to a public safety network slice, and wherein the network sub-slice is specified for public safety devices with encrypted communications.

9. The system of claim 1, wherein the defined specification data of the network slice corresponds to a public safety network slice, and wherein the network sub-slice is specified for public safety devices with mission critical services.

10. The system of claim 1, wherein the resources of the network slice comprise first resources and second resources, wherein the network sub-slice is a first network sub-slice allocated from the first resources, and wherein the operations further comprise allocating the second resources of the network slice for operation as a second network sub-slice.

11. A method comprising:
instantiating, by a system comprising a processor, a network slice having defined specification data, wherein the network slice comprises an end-to-end logical network;
allocating, by the system, resources of the network slice for operation as a network sub-slice within the network slice, wherein the allocating comprises modifying the defined specification data of the network slice into modified specification data of the network sub-slice, wherein the resources of the network slice provide a total bandwidth to be allocated to the network slice, and wherein the allocating the resources of the network slice for operation as the network sub-slice comprises allocating a percentage of the total bandwidth to the network sub-slice; and
controlling, by the system, network traffic of mobile equipment associated with the network sub-slice based on the modified specification data.

12. The method of claim 11, further comprising:
determining a group type of a mobile device during a network attachment of the mobile device; and
mapping the mobile device to the network sub-slice based on the group type.

13. The method of claim 11, wherein the defined specification data of the network slice corresponds to a first quality of service level, and wherein the modified specification data of the network sub-slice corresponds to a second quality of service level that is different from the first quality of service level.

14. The method of claim 11, wherein the defined specification data of the network slice corresponds to a first feature set, and wherein the modified specification data of the network sub-slice corresponds to a second feature set that is different from the first feature set.

15. The method of claim 14, wherein the second feature set is different from the first feature set based on a difference in at least one of: IP address data, network type data, packet size data, cloud computing service data, or cloud-based infrastructure resource data.

16. The method of claim 11, wherein the defined specification data of the network slice corresponds to a first type of internet of things device, and wherein the modified specification data of the network sub-slice corresponds to a second type of internet of things device.

17. The method of claim 11, wherein the defined specification data of the network slice corresponds to a public safety network slice, and wherein the network sub-slice is specified for public safety internet of things devices.

18. A non-transitory machine-readable medium, comprising executable instructions that, when executed by a processor of a system, facilitate performance of operations, the operations comprising:
instantiating a network slice having defined specification data, wherein the network slice comprises an end-to-end logical network;
allocating resources of the network slice for operation as a network sub-slice within the network slice, wherein the allocating comprises modifying the defined specification data of the network slice into modified specification data of the network sub-slice, wherein the resources of the network slice provide a total bandwidth to be allocated to the network slice, and wherein the allocating the resources of the network slice for operation as the network sub-slice comprises allocating a percentage of the total bandwidth to the network sub-slice; and
controlling network traffic of mobile equipment associated with the network sub-slice based on the modified specification data.

19. The non-transitory machine-readable medium of claim 18, wherein the operations further comprise:
determining a group type of a mobile device during a network attachment of the mobile device; and
mapping the mobile device to the network sub-slice based on the group type.

20. The non-transitory machine-readable medium of claim 18, wherein the defined specification data of the network slice corresponds to a first quality of service level, and wherein the modified specification data of the network sub-slice corresponds to a second quality of service level that is different from the first quality of service level.

* * * * *